July 29, 1969   D. M. WARNER   3,458,146
TOROIDAL WINDING METHOD AND APPARATUS
Filed Aug. 17, 1967   7 Sheets-Sheet 1

INVENTOR.
DARREL M. WARNER
BY D. Gordon Angus
ATTORNEY.

INVENTOR.
DARREL M. WARNER
BY D. Gordon Angus
ATTORNEY

D. M. WARNER 3,458,146

TOROIDAL WINDING METHOD AND APPARATUS

Filed Aug. 17, 1967

INVENTOR.
DARREL M. WARNER
BY
ATTORNEY.

United States Patent Office 3,458,146
Patented July 29, 1969

3,458,146
TOROIDAL WINDING METHOD AND APPARATUS
Darrel M. Warner, West Covina, Calif., assignor to Aerojet-General Corporation, El Monte, Calif., a corporation of Ohio
Filed Aug. 17, 1967, Ser. No. 661,455
Int. Cl. B65h 81/02, 81/00; B29h 17/02
U.S. Cl. 242—4         24 Claims

ABSTRACT OF THE DISCLOSURE

This disclosure relates to the method and apparatus for winding filament on a toroidal object, e.g., a tire, by providing a guide ring rotated about its own axis and passing through the opening of the toroid and a guide reciprocable on the ring along the ring axis. The toroidal object has a smaller inner periphery than its outer periphery requiring compensation in distributing the windings to achieve an even helical pattern on both peripheries. An even distribution of windings is accomplished by: (1) rotating the ring about its own axis to wind filament on the toroid; (2) passing the ring along the toroid at a constant rate to generally, helically distribute the filament windings, and (3) reciprocating the guide along the ring axis in a predetermined relation to the ring rotation to have the effect of advancing or retracting the point of winding to compensate for the different size peripheries. In one form of the invention, the toroid is held stationary by a plurality of holders projected and retracted in individual sequence to permit passage of the ring about the toroid. In another form of the invention, the ring is in a fixed position and the toroid is rotated about its own axis. Feedback means can be used to check and coordinate the relative movements of the ring, toroid and guide.

---

This invention relates to filament winding machines, and particularly to apparatus for winding filament material on an object having a toroidal surface.

Apparatus according to the present invention is particularly useful for winding continuous filament cord on a toroidal mandrel for forming tires.

Conventional tires are produced by sandwiching fiber reinforcement between layers of rubber. The fiber-reinforced rubber is cut into sheets for specific tire sizes, and the sheets are placed by hand on a drum and wrapped around wire bead bundles to form a rim-locking portion of the tire. In subsequent operations, additional material is added for the side walls and tread, and the tire is cured in a press to form its final shape.

The fabrication of conventional tires involves time-consuming and costly manual application of the plies of cord reinforcement. Furthermore, due to the nature of the design of conventional tires, the cord reinforcement terminates after being wrapped around the bead, and the full strength of the cord is not realized. Further, due to the wrapping of the fiber-reinforced rubber around the beads, the thickness of rubber around the beads is greater than the thickness of the tire carcass, thereby contributing to undesirable heat buildup. Also, a natural flexural hinge point develops around the bead which, when combined with the excessive thickness of rubber and flexing at the bead location, contributes to fatigue failure.

It has been proposed that many of the problems associated with conventional tires could be reduced or even eliminated by continuously winding the filament reinforcement on layers of rubber to construct a tire carcass having a substantially uniform thickness. If the cord reinforcement was continuously wound in the carcass, the cord pattern could be arranged in any optimum design to support loads within the tire. Instead of being limited to radial cord patterns, as in the case of conventional tires, the cord pattern of a continuously-wound cord reinforced tire may be optimized so that all filaments are uniformly stressed within the toroid. For example, a toroid having helically wound cords has greater strength than conventional toroids because the cords, being helically arranged, support loads along their length more uniformly than conventional radial designs.

The present invention relates to winding apparatus for continuously winding filament cord over a toroidal object, and particularly to winding cord reinforcement over toroidal pressure vessels.

It is an object of the present invention to provide apparatus for continuously winding filaments on a toroidal object.

Another object of the present invention is to provide apparatus for continuously winding filament material over a toroidal object whereby the winding make take on any desired pattern.

According to the present invention, apparatus is provided for winding filament material on a toroidal object having a surface define by rotating a closed curved surface about an axis. The apparatus comprises guide means for guiding the filament material onto the object. First means is provided for supporting and moving the guide means around the closed curved surface. Second means provides relative rotation between the object and the guide means about the axis of the toroid.

According to an optional but desirable feature of the present invention the second means comprises means for rotating the toroidal object about the axis.

According to another optional but desirable feature of the present invention, the means for providing relative motion comprises means for rotating the guide means about said axis.

The above and other features of the present invention will be more fully understood from the following detailed description and the accompanying drawings, in which.

Figure 1:
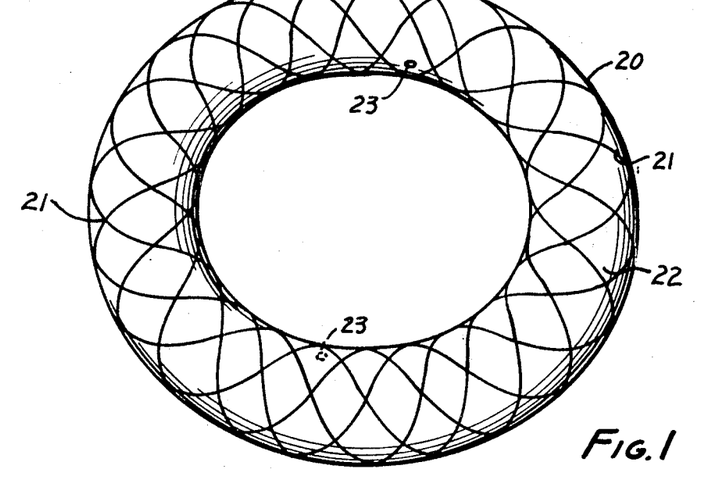
FIG. 1 is a perspective view of a toroidal object, such as a tire, having continuously-wound filament windings in a pattern, wound by apparatus according to the present invention.

Referring now to the figures and particularly to FIG. 1, there is illustrated a toroidal object 20 such as a tire carcass, having filament winding 21 wrapped thereon. The tire carcass is the reinforcement and forming part of the tire to which sidewalls and tread are added to complete the tire. The filament may be used for reinforcement of existing toroidal objects, or for construction of toroidal objects by winding directly on a torodial mandrel. Combinations of square-woven nylon monofilament in rubber and square-woven wire in rubber are examples of cord filaments commonly used in tires and which may be utilized in winding the tire illustrated in FIG. 1. As other examples of filament winding material, graphite yarns, boron fibers, beryllium wire, silicon carbide, aluminum boron silicate, beryllium glass filament and glass filament rovings may be used. The particular filament material utilized for winding the filament construction of the toroidal object 20 illustrated in FIG. 1 is a matter of choice, and depends upon strength factors, availability and intended use of the toroidal object. The term "filament cord" as used herein is used interchangeably with "filament windings" and is intended to include all filament roving material as well as nylon cord for use as construction or reinforcement of objects.

Although the toroid constructed or reinforced in accordance with this invention may be any toroid, the invention will be described in connection with the reinforcement of a toroidal tire. It is to be understood, however, that the illustration of the reinforcement of a tire is given by way of example, and should not be considered limiting on this invention.

The construction of a tire, such as toroidal object 20 in FIG. 1, is conveniently performed by providing a toroidal mandrel (not shown) constructed of a destructible material. A rubber layer 22 is applied over the mandrel and filament windings 21 are continuously wound over rubber layer 22 in any suitable design, such as a helical design illustrated in FIG. 1. Alternate layers of filament cord winding and rubber are applied to the mandrel to build up the tire to a desired number of piles. Upon completion of the winding and fabrication of the carcass of the rubber and cord plies, the tread and sidewalls of the tire may be added by conventional techniques, and the plaster mandrel may thereafter be washed out. The tire may then be cured in a suitable heat oven.

By way of example, the mandrel may be constructed of a suitable washout plaster, for example "Kerr D.M.M. Plaster" available from Dickells Co. of Los Angeles, Calif. The mandrel may be either a hollow mandrel or a solid mandrel, although hollow mandrels are more desirable since they are more easily destroyed in the final operation of removing the mandrel. The rubber layer 22 may be any suitable rubber layer for a tire, such as a neoprene rubber formulation commercially available from The General Tire and Rubber Company of Akron, Ohio, as "K–58." Filament windings 21 are preferably preimpregnated with a suitable bonding agent, such as an epoxy resin, but it is to be understood that the applicaiton of bonding agent may be done during any convenient step of construction. The alternate layers of rubber applied over the wound core may be a butyl rubber formulation commercially available from The General Tire and Rubber Company of Akron, Ohio as "K–59."

To destroy a mandrel constructed of "Kerr D.M.M. Plaster," a solution of 20% acetic acid may be circulated to the interior portion of the tire. To facilitate the washout operation, the tire is wound having a pair of apertures 23 disposed approximately 180° apart on the inner portion of the tire. The washout fluid may be forced in one of the apertures 23, through the mandrel and out the other aperture 23 for recirculation. In this manner, the washout fluid dissolves the mandrel and removes the mandrel-forming material from the tire.

The present invention is drawn to apparatus for winding filament cord 21 on toroidal object 20 such as a tire. The apparatus generally comprises a guide means for guiding the filament material onto the toroidal object, first means, having an axis preferably centered on the closed curved surface of the toroid for moving the guide means around the toroidal object, and second means for providing relative motion between the toroidal object and the guide means about the axis of the toroidal object. According to one form of the invention, the toroidal object is held in a stationary position and the guide means is rotated about the axis of the toroid. According to the presently preferred form of the invention, the toroid is rotated past the guide on its own axis.

To obtain a helical pattern of continuously-wound filament cord, the cord is wound around the closed curved periphery or surface of the toroid in a continuous pattern around the toroid axis. Since the inner periphery of a toroid is of smaller diameter than the outer periphery, the linear velocity of the inner periphery will be less than the linear velocity of the outer periphery when the toroid is rotated about its axis. Therefore, to compensate for the difference in linear velocity along the surface of the toroid as the first means moves the guide means around the toroid at a constant angular velocity, reciprocating means is provided on the first means for reciprocating the guide means to compensate for the difference in linear velocity. Thus, as the first means (which may, for example, be a winding ring) rotates the guide means (which may, for example, be a payoff head) around the closed curved surface of the toroid from the outer periphery toward the inner periphery, the reciprocating means moves the guide means, or payoff head, forward of the surface of the toroid. Likewise, as the guide means, or payoff head, is rotated from the inner periphery toward the outer periphery, the reciprocating means moves the guide means, or payoff head, backward to subtract from the increasing linear velocity of the surface of the toroid.

Figure 2:
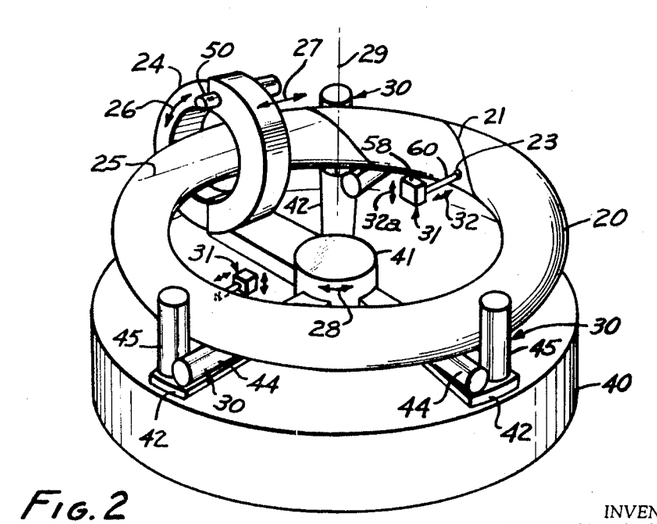
FIG. 2 is a simplified representation of one form of the invention illustrating certain motions performed during a winding operation for winding a pattern of continuous filament windings on a toroid.

Referring particularly to FIG. 2 which is a simplified representation of one form of the invention, there is illustrated a guide means 24, such as a rotatable payoff ring capable of rotating about its own axis 25 as indicated by arrow 26. The payoff ring 24 is mounted to housing 41 which in turn is rotationally supported by base 40 and is capable of rotating about axis 29 of toroid 20 as indicated by arrow 28. The payoff ring supports a payoff head 50 for guiding filament cord onto the toroid. The payoff head is capable of reciprocating along axis 25 of the payoff ring as indicated by arrow 27.

Mounted to housing 41 are a plurality of arms 42, each supporting a roller assembly 30. Each roller assembly includes rollers 44 and 45 which support and locate the toroid. As will be further explained hereinafter, the roller assemblies are adjustable so as to accommodate any desired size of toroid.

Holding assembly 31 includes housing 58 and pin 60. As indicated by arrow 32, pin 60 is capable of moving perpendicular to axis 29 and is capable of engaging in apertures 23 in toroid 20. Housing 58 is supported by base 40 by means not shown and is capable of moving parallel to axis 29 as indicated by arrow 32a. In operation of the apparatus represented in FIG. 2, the toroid is positioned by rollers 44 and 45 and held stationary by pins 60 in apertures 23. Housing 41 supporting the payoff ring 24 and the roller assemblies, rotates around axis 29. At the same time, ring 24 rotates around axis 25. Also, guide means 50 reciprocates along axis 25.

Each time the winding ring approaches the vicinity of a holding mechanism 31, the pin 60 of that holding mechanism retracts into housing 58, and the housing moves upward (by means not shown) to provide clearance for the winding ring. After the winding ring passes the aperture, the holding assembly returns housing 58 to the vicinity near the toroid, and pin 60 is reinserted into the associated aperture. As will be explained more clearly hereinafter, the toroid has at least one pin 60 inserted into an associated aperture 23 at all times so as to prevent movement of the toroid.

Figures 3, 4, 5:
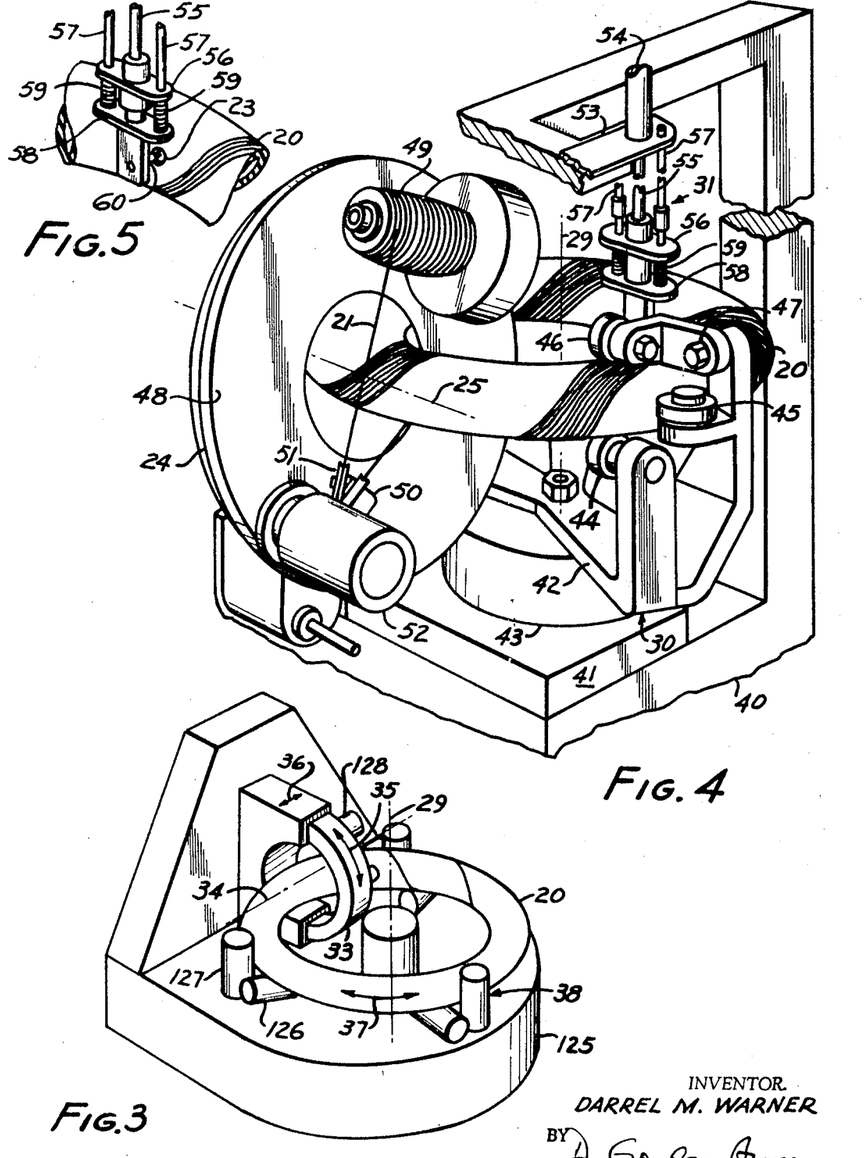
FIG. 3 is a simplified representation of the presently preferred form of the invention illustrating certain motions performed during a winding operation for winding a pattern of continuous filament windings on a toroid.
FIG. 4 is a partly cutaway perspective view of winding apparatus according to one form of the present invention, winding continuous filament windings on a toroid.
FIG. 5 is a perspective view of a portion of the toroid and the winding apparatus illustrated in FIG. 4.

Referring to FIG. 3 which is a simplified representation of another form of the invention, a payoff ring 33 is supported by base 125 and is rotated about its own axis 34 as indicated by arrow 35. In addition, the payoff ring supports payoff head 128 which is capable of moving along axis 34 as indicated by arrow 36. In this form of the invention, means (not shown in FIG. 3) is provided for rotating toroid 20 about its own axis 29. This motion is illustrated by arrow 37. By way of example, a suitable belt or roller may be provided in contact with the toroid so that upon driving the belt or roller, the toroid is rotated about axis 29. Roller assemblies 38 are supported by base 125 and provide support for the toroid 20 as it rotates about its own axis. Each roller assembly includes rollers 126 and 127 which are rotatably supported by base 125. As will be explained hereinafter, roller assemblies 38 are adjustable to accommodate any desirable size of toroid. In the embodiment illustrated by the motion diagram of FIG. 3, the toroid 20 is rotated about its axis 29 past the payoff ring so as to wind windings 21 on the toroid.

In FIGS. 4–10 there is illustrated apparatus for winding filament material on a toroidal object having motions in accordance with the schematic motion diagram illustrated in FIG. 2. The apparatus is provided with a base 40. Housing 41 is journaled to base 40 by means (not shown) and is capable of rotaing about axis 29. Toroid 20 is supported by roller assembly 30 and holding assembly 31 so as to be centered on axis 29. Preferably, there are provided a plurality of roller assemblies 30 such as illustrated in motion diagram of FIG. 2, but only one roller assembly has been illustrated in FIG. 4 for purposes of simplicity. Although there may be any number of roller assemblies 30, it has been found that three roller assemblies provide location of toroid 20 by triangulation.

Each roller assembly 30 includes an arm 42 supported to rotating housing 41 by a suitable chuck mechanism 43. Chuck mechanism 43 permits radial extension of arms 42 so as to accommodate the winding of a toroidal object having any desirable diameter. Mounted to arm 42 of each roller assembly 30 are a pair of rollers 44 and 45 disposed to support the lowermost and outermost portions of toroid 20, respectively, and a roller 46 pivotally mounted by pivot means 47 to arm 42 so as to permit opening and closing the roller means over the toroid to permit access and removal of the toroid. Roller 46 is adapted to support the uppermost portion of toroid 20.

Payoff ring 24, which preferably is a split ring fastened by means not shown to accommodate receiving and removing toroid 20, is rotatably supported by housing 41 so as to rotate about axis 29 of the housing with the roller assemblies 30. The means for supporting payoff ring 24 to housing 41 includes a gear mechanism, and is shown in greater detail in FIG. 6. The gear mechanism provides rotation of payoff ring 24 about its own axis 25. Supported on the face 48 of payoff ring 25 are a spool 49, having a supply of filament material, and a payoff head 50 for guiding the filament material onto toroid 20. Suitable guide rollers 51 may be provided so as to guide filament material 21 from spool 49 to payoff head 50.

Payoff head 50 is mounted to reciprocating mechanism 52, which in turn is supported by payoff ring 24. Mechanism 52 is provided with suitable cam means (not shown in FIG. 4 but illustrated in further detail in FIGS. 6 and 7) which causes payoff head 50 to reciprocate in the direction along axis 25 of payoff ring 24 so as to helically wind filament material 21 onto toroidal object 20. In addition, payoff head 50 is preferably swivel-mounted to reciprocating mechanism 52 so that the angle of direction of the filament material onto the toroid may be selectively altered. In this manner, the angle of the helical winding may be selected to any desirable angle by altering the swivel position of payoff head 50 and by altering the travel of reciprocation of the mechanism 52. Reciprocating mechanism 52 is cam-mounted to a suitable cam (not shown in FIG. 4 but illustrated in FIGS. 6 and 7) on the face of payoff ring 24 opposite from face 48.

Holding mechanism 31 is supported by bar 53 mounted to housing 40. Holding assembly 31 includes a cylinder 54 having a piston (not shown) disposed therein to which is connected piston rod 55. Housing 56 is connected to the opposite end of piston rod 55. Suitable guide rods 57 are slidably supported by both support bar 53 and housing 56, and are attached to pin housing 58. Suitable compression springs 59 are provided for normally biasing pin housing 58 away from housing 56. As shown particularly in FIG. 5, pin housing 58 includes a pin 60 adapted to enter aperture 23 is toroid 20.

Figures 6, 8:
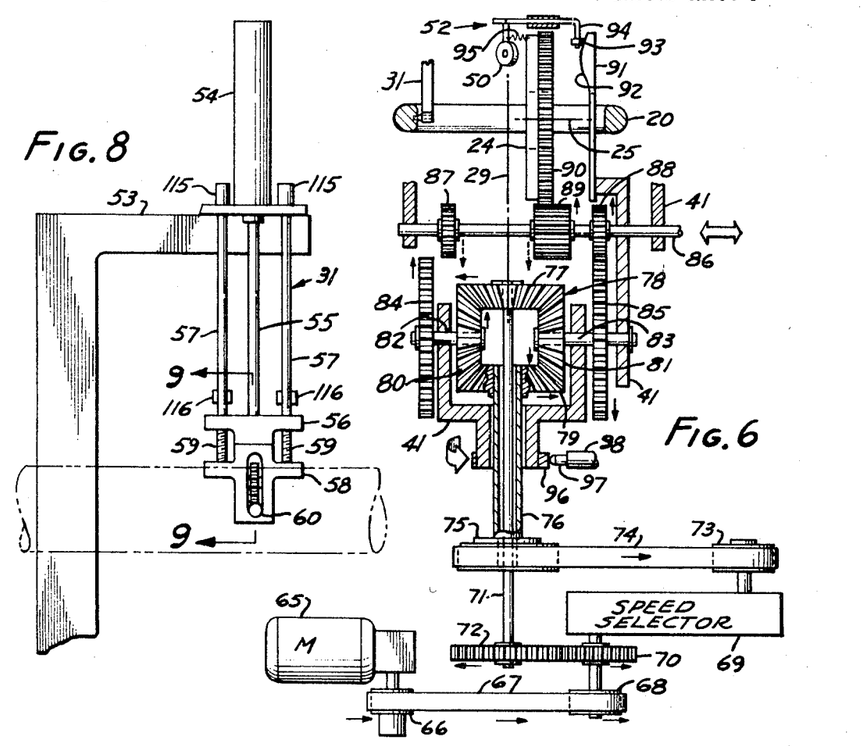
FIG. 6 is a partially cutaway view of a portion of a power and motion circuit for the winding apparatus illustrated in FIG. 4.
FIG. 8 is an elevation of a portion of a toroid-holding mechanism useful in the winding apparatus illustrated in FIG. 4.
Figure 9:
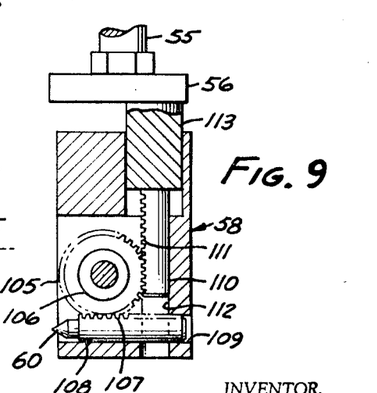
FIG. 9 is a cutaway side elevation view taken along line 9—9 of FIG. 8 of a pin-locating mechanism useful in the holding mechanism illustrated in FIG. 8.
Figure 10:
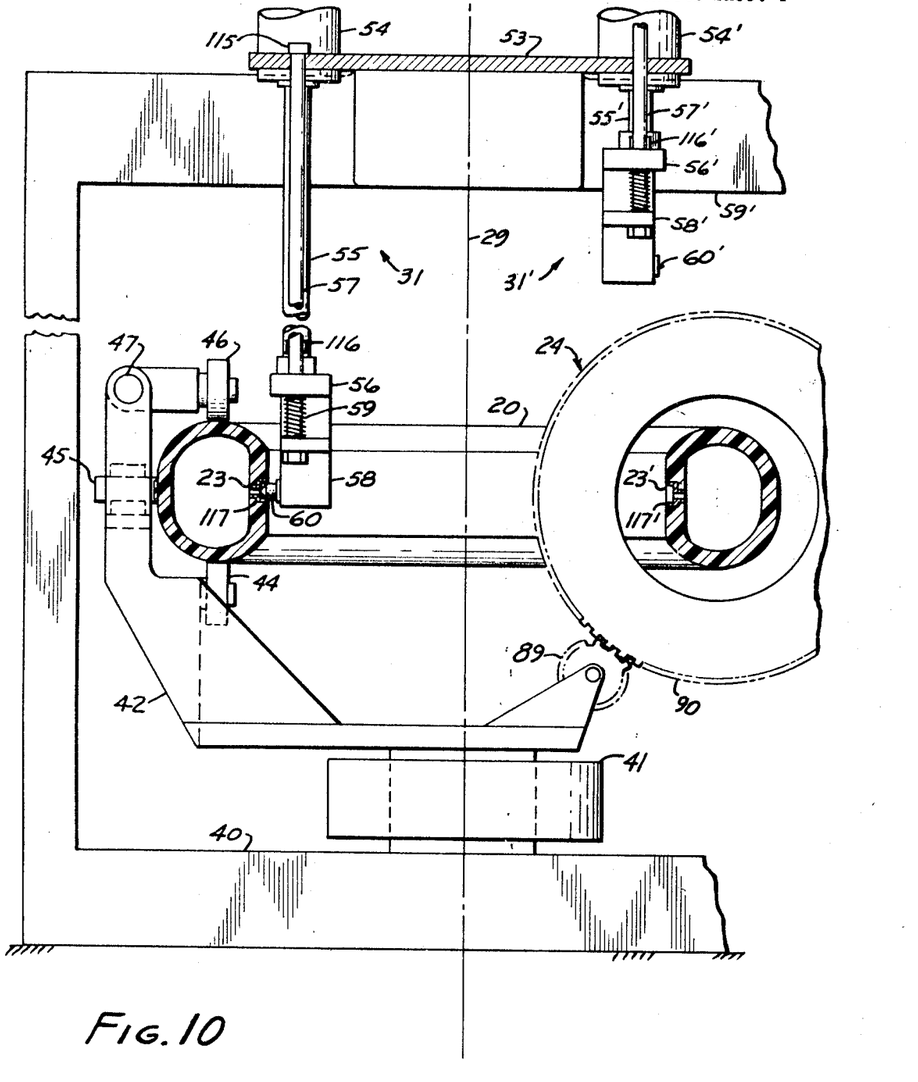
FIG. 10 is a partially cutaway side elevation of a portion of the apparatus illustrated in FIG. 4.

Holding mechanism 31 is illustrated in greater detail in FIGS. 8, 9 and 10. Suffice is to say at this point that the purpose of holding mechanism 31 is to maintain pin 60 inserted in aperture 23 in toroid 20, to hold the toroid in a fixed position, and to remove the pin when the payoff ring rotates about axis 29 to the vicinity of aperture 23.

Preferably as will be further understood in connection with FIGS. 8, 9 and 10, there are provided a pair of holding mechanisms 31 for operation on each of apertures 23. In this manner, at least one holding mechanism has a pin inserted in one of the oppositely disposed apertures 23 at all times. Thus, when payoff ring 24 rotates on axis 29 to the vicinity of a holding mechanism, and that holding mechanism is retracted from toroid 20, the toroid is still maintained in a fixed position due to the opposite holding mechanism 31. (The second holding mechanism 31 has been eliminated from FIG. 4 for purpose of simplicity of the drawings, but it is to be understood that a second holding mechanism should normally be provided.)

FIG. 6 illustrates a schematic diagram of the mechanical circuit for producing the various motions for the winding apparatus illustrated in FIG. 4. Motor 65 is mechanically coupled to pulley 66 so as to drive endless belt 67. Motor 65 may be energized by any suitable means, such as a suitable source of electrical energy (not shown). Belt 67 drives pulley 68 which in turn provides inputs to both speed selector 69 and gear 70. Gear 70 meshes with gear 72 to rotate shaft 71. Speed selector 69 drives pulley 73 which in turn drives endless belt 74 to drive pulley 75. Pulley 75 drives shaft 76. The arrangement of gears 70 and 72 and of speed selector 69 is to drive shaft 71 in the opposite direction from the direction of rotation of shaft 76.

Shaft 71 is preferably but not necessarily disposed within shaft 76 and is connected to gear 77 of differential 78. Shaft 76 is connected to opposite gear 79 of differential 78, the gears 77 and 79 being interconnected by pinion gears 80 and 81, respectively. Gears 80 and 81 are mounted on shafts 82 and 83, respectively, which are journaled to housing 41. Gears 84 and 85 are mounted on shafts 82 and 83, respectively, so as to be driven in opposite directions by gears 80 and 81.

Shaft 86 is journaled to housing 41 and has gears 87, 88 and 89 mounted thereon. Shaft 86 is slidably journaled to housing 41 so that gear 87 may be engaged with gear 84 or that gear 88 may be engaged to gear 85. In either position, gear 89 is engaged with gear 90 mounted to payoff ring 24. It can be understood that the selection of engagement of gears 81, 84, 87 or 88 effectuates a reversing feature for reversing the direction of rotation of gear 90.

The mechanism illustrated in FIG. 6 as thus far described provides rotation of payoff ring 24 about its own axis 25 and about axis 29 of toriod 20. In operation, motor 65 provides rotational energy to drive shaft 71 which in turn drives gear 77 of the differential. In addition, shaft 76 is rotated to drive gear 79 in the opposite direction. Speed selector 69 permits a selection of rotational speed for shaft 76. Assuming for the moment that speed selector 69 in adjusted so that sharft 76 is not permitted to rotate, motor 65 drives shaft 71 to impart rotational energy to gear 77. This induces rotational energy to each of gears 80 and 81. Since gears 80 and 81 are engaged with the now stationary gear 79, the effect is to drive gears 80 and 81 about the axis of shaft 71. This is caused by the rotation of gear 77 and the stationary position of gear 79. Since shafts 82 and 83, connected to gears 80 and 81 respectively, are journaled to housing 41 (which in turn is journaled to base 40 as illustrated in FIG. 4), housing 41 is caused to rotate about axis 29. This rotational energy about axis 29 causes payoff ring 24 to rotate about axis 29 as hereinbefore explained. In addition, due to the rotation of gear 81, shaft 86 is rotated about its axis, thereby rotating the payoff head about its axis 25.

Assuming that shafts 71 and 76 are rotating in opposite directions at the same speed, it can be seen that each is driving gears 77 and 79 in opposite directions, thereby each driving gears 80 and 81 in opposite directions. Thus, no rotation is imparted to housing 41 about axis 29, but payoff ring 24 is caused to rotate about its axis 25.

Thus, by selectively adjusting the speed of rotation of shaft 76 and constantly driving the speed of rotation of shaft 71, the relative speeds of rotation of payoff head 24 about each of axes 25 and 29 may be selectively adjusted.

Referring to FIG. 4, the mounting of payoff ring 24 to housing 41 may be accomplished by a suitable housing (not shown) having a disc 91 (not shown in FIG. 4 but shown in FIGS. 6 and 7) supported therein and journaled to payoff ring 24.

Figure 7:
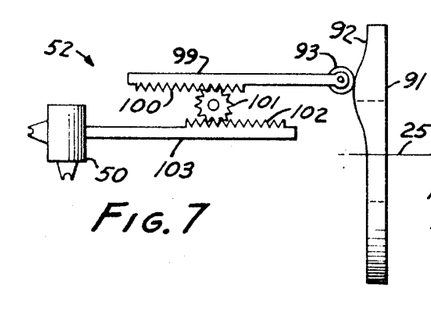
FIG. 7 is a side view elevation of a modification of a portion of the winding apparatus illustrated in FIG. 4.

Disc 91 has a cam face 92. The type of cam illustrated wherein the cam face is on a substantially cylindrical or ringshaped disc, is sometimes referred to as a "barrel cam." Reciprocating mechanism 52 (illustrated in FIG. 4) is mounted to the payoff ring 25 and includes a cam follower 93 adapted to contact and follow the face of the barrel cam 92. Cam follower 93 includes a shaft 94 journaled to the payoff ring and supports payoff head 50. A tension spring 95 biases shaft 94 in such a manner that cam follower 93 continuously follows the barrel cam face 92 of disc 91.

As the payoff ring 24 rotates about its axis 25, cam follower 93 follows the shape of the barrel cam face 92 to thereby cause the shaft 94 to move in the direction along axis 25. This causes the payoff head 50 to reciprocate back and forth along the axis of the payoff ring. In this manner, the helical pattern of the filament rovings 21 (FIG. 4) is achieved.

FIG. 7 illustrates a modification of reciprocating mechanism 52. Disc 91 is journaled to the payoff ring 24 in a fixed position on housing 41 and has its axis aligned with axis 25 of the payoff ring. Contacting the face 92 of the barrel cam is cam follower 93 mounted to shaft 99. Shaft 99 has a gear rack 100 which is engaged to pinion gear 101. Pinion gear 101 is also engaged to the gear rack 102 of shaft 103. Payoff head 50 is mounted to shaft 103. In operation, as cam follower 93 traces the face 92 of the barrel cam, shaft 99 reciprocates back and forth thereby rotating rack gear 101 to and fro. This causes a back and forth reciprocating motion of shaft 103, thereby controlling the movement of payoff head 50.

To synchronize the movement of the holding mechanism 31, a dog cam 96 is mounted to housing 41. As housing 41 rotates, thereby moving the payoff ring 24 about axis 29, dog cam 96 rotates. Cam follower 97, connected to air valve 98, traces dog cam 96 to operate the air valve. Air valve 98 controls the movement of the piston within cylinder 54 (FIG. 4) to control the operation of the holding mechanism 31.

Referring particularly to FIGS. 8 and 10, the holding mechanism for holding toroid 20 in position during a winding operation is illustrated. As illustrated particularly in FIG. 9, pin housing 58 contains a pinion gear 105 rotatably mounted to shaft 106. Pinion gear 105 is engaged with rack gear 107 of slide shaft 108 which slides in channel 109 of the housing. Shaft 108 supports pin 60. A second shaft 110 having a rack gear 111 is engaged to the pinion gear 105 and is adapted to slide in channel 112. Shaft 110 is supported by arm 113 which in turn is connected to housing 56. As hereinbefore explained, housing 56 is connected to piston rod 55 of cylinder 54 (FIG. 8). Thus, as housing 56 is moved to and from housing 58, shaft 110 is moved up and down, thereby imparting rotation to pinion gear 105. This action causes pin 60 to move in and out of housing 58. Thus, by separating housings 56 and 58, pin 60 is retracted into the housing, and by moving housings 56 and 58 together, pin 60 is extruded from the housing and into the aperture 23 of toroid 20 (FIGS. 4 and 10).

Referring particularly to FIG. 8, the mechanism for moving the housings to provide clearance for payoff head 24 is illustrated in greater detail. As hereinbefore explained, housing 56 is connected to piston rod 55 which in turn is connected to a piston (not shown) within cylinder 54. Housing 58 is connected to guide rods 57. Housings 56 and 58 are normally biased apart by compression springs 59. Guides 57 are slidably mounted to both housing 56 and support bar 53. A stop mechanism 115 for limiting the downward travel of housing 58 is provided at the uppermost portions of each of guides 57. It is preferred that a suitable mechanism for limiting the separation of housings 56 and 58 be provided so they do not become too far separated. One convenient mechanism for this arrangement is to provide stop mechanisms 116 on each of guide rods 57 so that upon raising housing 56 on piston rod 55, housing 56 contacts stop mechanism 116 thereby retracting the entire mechanism. In this manner, housing 58, which is connected to the guide mechanisms, is raised.

Assuming that pin 60 is extruded from housing 58 into aperture 23 such as shown on the left-hand portion of FIG. 10, and that the holding mechanism 31 is to be raised, housing 41 (FIG. 6) rotates to a position such that dog cam 96 operates on cam follower 97 to operate air valve 98. This operation causes air to be impressed to the interior of cylinder 54 (FIG. 8) thereby retracting the piston therein. Retraction of the piston within cylinder 58 causes piston rod 55 to rise. As the piston rod rises, housing 56, which is connected to the piston rod, also rises thereby rotating pinion gear 105 (FIG. 9) to retract pin 60 from apertures 23 (FIG. 10) of the toroid. When piston rod 55 has risen to a point retracting housing 56 to contact stops 116, housing 58 is caused to rise with housing 56 on piston rod 55 until the device is entirely retracted.

Conversely, to return pin 60 to aperture 23 of the toroid, the dog cam 96 operates on the cam follower 97 causing air valve 98 to operate on the cylinder 54 to move piston rod 55 downward until stops 115 on guide rods 57 reach the limiting position of the guide rods. At this point, the pin 60 will be aligned, but retracted from, the aperture 23. Piston rod 55 continues downward against housing 56 thereby compressing compression springs 59 and causing shafts 110 of housing 56 to move downwardly in channel 112 in housing 58 thereby rotating the pinion gear 105. Pin 60 thereby extrudes from housing 58 and into aperture 23.

FIG. 10 illustrates the operation of both holding mechanisms 31 wherein the toroid 20 is supported by the rollers 44, 45 and 46 and is supported by one extended pin 60 on the left side of the drawing and one retracted pin 60' on the right side of the drawing. In the position of the pins in FIG. 10, the payoff ring 24 is in a position whereby holding mechanism 31' must be retracted to permit clearance for the payoff ring. For the purpose of simplicity in FIG. 10, the disc 91 (FIG. 6) having the barrel cam face has been removed as has the mechanism 52 for providing reciprocation to the payoff head 50.

In the drawing of FIG. 10, the payoff head is actually behind the payoff ring 24, and FIG. 10 illustrates the gearing mechanism connected with housing 41 in support of the payoff ring. Support of disc 91 from housing 41 has likewise been removed for purposes of simplicity.

As illustrated in FIG. 10, each of the roller mechanisms (only one is illustrated in FIG. 10, but it is to be understood three roller mechanisms are preferred to triangulate the location of the toroid 20) are mounted to rotating housing 41 and rotate about the toroid 20 with payoff ring 24. Upon actuation of either air valve 89 (FIG. 6) by the contact of a cam follower 97 against dog cam 96 (mounted to housing 41), the respective cylinder 54 is actuated, causing piston rod 55 to move up to retract the respective pin and move it away when the payoff head comes into location of the pin. Thus, pin 60' is illustrated in its retracted position permitting clearance for payoff head 24 to move past the location of aperture 23'.

As illustrated in FIG. 10, a fitting such as fitting 117 may be placed in each aperture 23 to accommodate reception of pin 60. Upon completion of the tire, fittings 117 may be fitted with suitable air valves to permit pressurization of the toroidal vessel.

In the operation of the winding apparatus illustrated in FIGS. 4–10, the toroid is held in a fixed position by holding mechanisms 31 by inserting pins 60 into aperture 23 of the toroid. Payoff ring 24 is continuously rotated around the closed curved surface of the toroid and around the axis of the toroid 29. Payoff head 50 supported by payoff ring 24 guides the filament winding 21 onto the toroidal object in a continuous manner so as to continuously wind the cord in any desired pattern. The pattern may be altered as desired by changing the face of the barrel cam which causes reciprocation of the payoff head along the axis of the payoff ring. The pattern may be further altered by altering the speed of rotation of the two shafts leading to the differential 78. Thus, the pattern wound may be any selected pattern such as a helical pattern or a radial pattern or any other desired pattern.

By moving the position of shaft 86 so that gear 84 meshes with gear 87, ring 24 is rotated in the opposite direction. This has the effect of reversing the direction of the cord pattern being wound on toroid 20.

To wrap cord in a helical path, payoff head 50, supported by ring 24, is rotated at a constant angular velocity around the closed curved surface of the toroid. At the same time, ring 24 is rotated at a constant angular velocity around the axis of the toroid. In addition, a third motion is imparted to the payoff head along axis 25 of the ring to compensate for the different linear velocities of the different portions of the surface of the surface of the toroid, as hereinbefore explained. This third motion is a reciprocating motion.

In FIGS. 11–14 there is illustrated the presently preferred embodiment of the present invention. This embodiment operates on the principle of continuously rotating the toroid about its own axis and rotating the payoff ring about its axis, thus permitting the payoff ring to be held in a fixed position relative to the axis of the toroid. Thus, unlike the rotation of the payoff ring about the axis of the toroid as in the previous embodiment, the embodiment illustrated in FIGS. 11–14 utilizes the principle that the toroid rotates on its own axis past the payoff ring. The principle of operation of the embodiment illustrated in FIGS. 11–14 is illustrated in FIG. 3.

Figure 11:
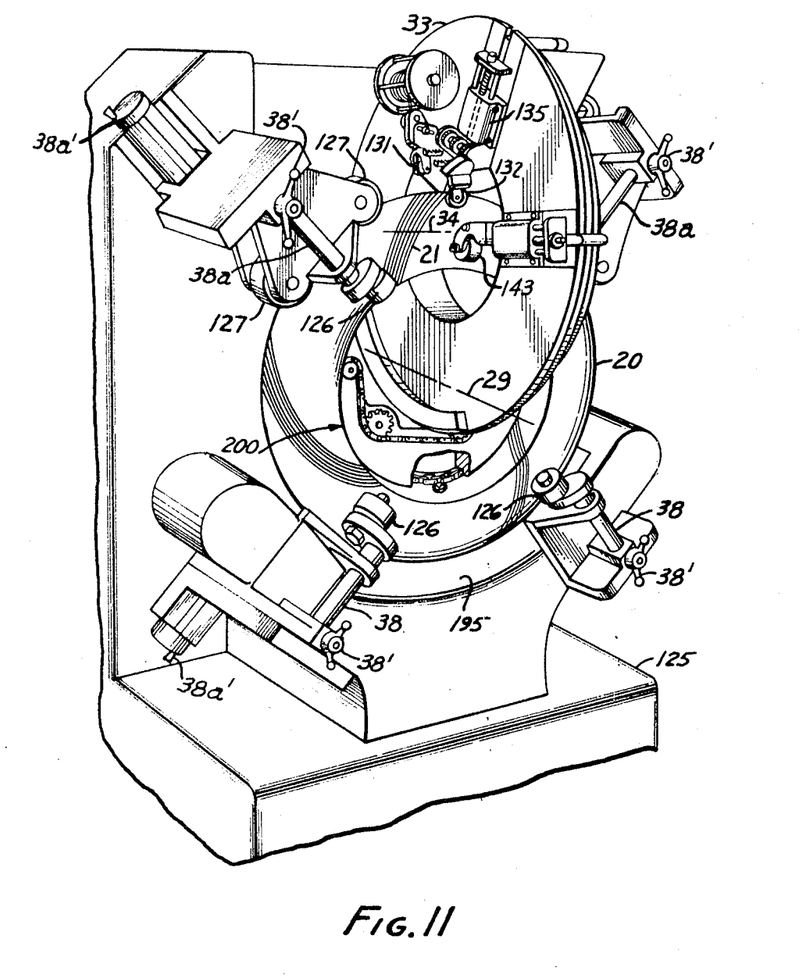
FIG. 11 is a partially cutaway perspective illustration of a portion of a winding machine according to the presently preferred embodiment of the invention, winding continuous filament windings on a toroid.
Figure 12:
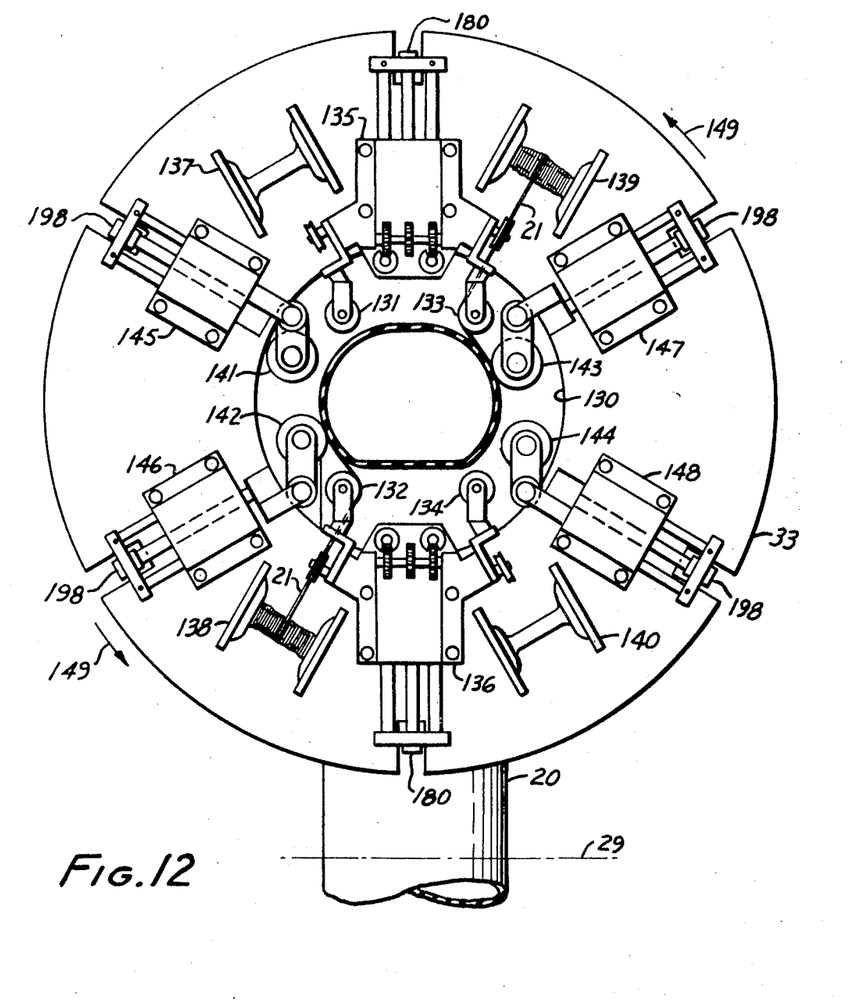
FIG. 12 is a plan view of a winding ring useful with the apparatus illustrated in FIG. 11.
Figure 13:
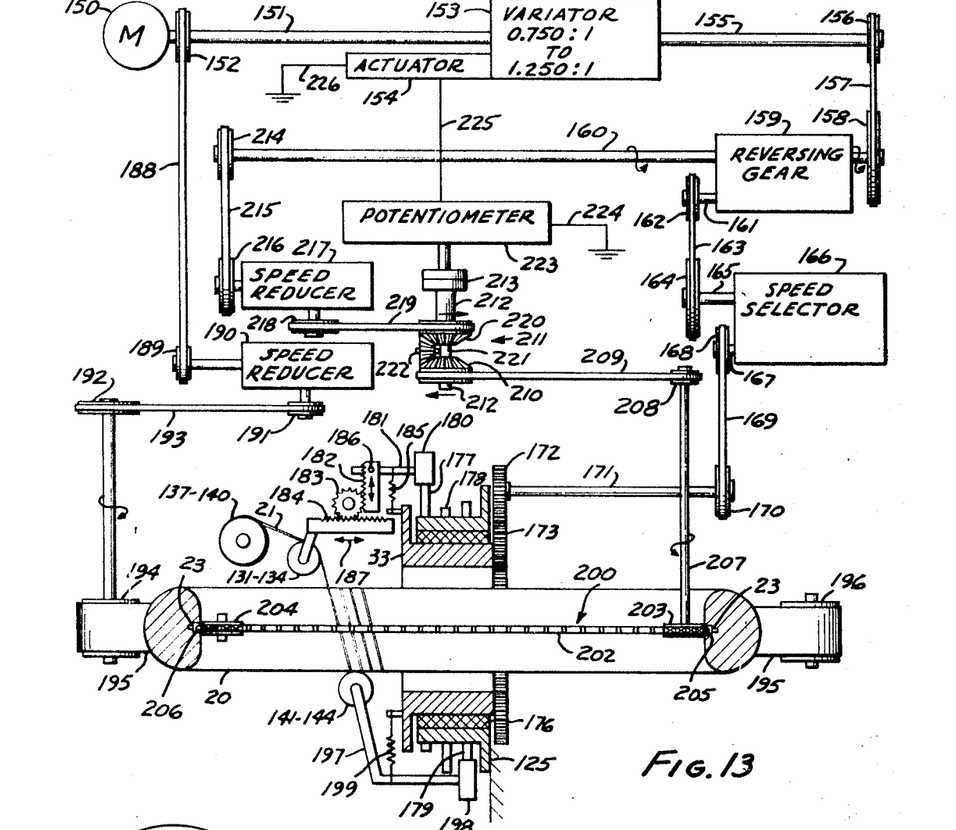
FIG. 13 is a partially cutaway view of a power and motion circuit for the embodiment illustrated in FIG. 11.

The winding mechanism illustrated in FIGS. 11–14 includes a payoff ring 33 having an axis 34 about which it rotates. Payoff ring 33 is journaled to base 125 by suitable bearings 176 (FIG. 13). Mounted to base 125 are a plurality of adjustable roller assemblies 38 each including a roller 126 for locating the position of toroid 20 along axis 29. Also included in the roller assemblies are additional rollers on the opposite side from that shown in the drawing of the toroid 20. Adjustable roller assemblies 38a include additional rollers 127 which contact the outer periphery of the toroid 20 to further position the toroid. Rollers 127 further bias the toroid downwardly toward endless belt 195 mounted within housing 125. Endless belt 195 contacts the outer portion of toroid 20 and induces rotation of toroid 20 about axis 29. In this embodiment, toroid 20 is permitted to rotate about its axis 29 through the opening of payoff ring 33. Payoff ring 33 includes several payoff heads 131, 132 mounted on support bracket 135 for guiding filament material 21 onto the toroid. Pressure roller 143 is provided to assure proper alignment of the wound filaments.

Roller assemblies 38 and 38a are adjustable by turn key 38' to rotate rollers 126 to open the roller assemblies to permit access to the toroid. By rotating turn keys 38' to their open position (not shown in the drawings), toroid 20 may be readily inserted or removed from the position shown in the drawing. Roller assemblies 38 and 38a are further adjustable by turn key 38a' to move rollers 127 and belt 195 toward axis 29 of the toroid. By adjusting the position of roller 127 against the outer portion of toroid 20, sufficient pressure against the toroid may be applied to assure proper pressure of the toroid against belt 195 so that as belt 195 moves, the toroid will rotate about its own axis. Also, the positioning of belt 195 and roller assemblies 38a permits adjustment of the space between them to accommodate any desired size of toroid to be held in the machine.

FIG. 12 is a plan view elevation of the face of a preferable form of payoff ring 33. Payoff ring 33, like payoff ring 24 of the previous embodiment, is preferably a split-ring payoff ring being separable so as to accommodate receiving toroid object 20 within the center space 130 of the ring. A plurality of payoff heads 131, 132, 133 and 134 are supported by the payoff ring 33. Payoff heads 131 and 133 are supported by bracket 135 and payoff heads 132 and 134 are supported by bracket 136. Each of brackets 135 and 136 have mounted thereto a cam follower 180 for purposes to be hereinafter described. The brackets 135 and 136 are spring-mounted to the face of payoff ring 33 by a spring (not shown in FIG. 12 but illustrated at 185 in FIG. 13). The purpose of the cam follower and spring-mounted brackets is to induce reciprocal movement of the payoff heads in a direction along axis 34 of the ring (see FIG. 11) to obtain a helical winding pattern of continuously wound filament material 21 onto toroidal object 20.

A plurality of spools 137–140 are associated with each of payoff heads 131–134, respectively. A plurality of cam operated pressure rollers 141–144 are disposed adjacent each respective payoff head 131–134 in such a manner as to assure proper aligning of the filament roving after it is wound on the toroidal object 20. Each of the pressure rollers 131–144 are supported by suitable brackets 145–148, respectively, which in turn are connected to cam followers 198.

As will be more fully understood hereafter, the purpose of the several spools and payoff heads and pressure rollers is to provide dual winding on the toroid 20 by oppositely-disposed payoff heads and pressure rollers. Thus, as illustrated in FIG. 12, with the payoff ring 33 rotating in a direction illustrated by arrows 149 (counterclockwise), oppositely-disposed payoff heads 132 and 133 are guiding filament winding 21 onto toroidal object 20, and oppositely-disposed pressure rollers 142 and 143 are assuring proper alignment of the pattern of filament rovings by applying pressure to the wound material to prevent it from slipping. Pressure rollers 141 and 144 are retracted from the position against the toroid by manual means not shown) and drives shaft 151 upon which is tion of winding from that illustrated in FIG. 12, oppositely-disposed payoff heads 131 and 134 would be used for winding filament roving 21 onto the toroid and pressure rollers 141 and 144 would be utilized for assuring the proper pattern on the toroid. In such a case, pressure rollers 142 and 143 would be retracted from the position shown in the drawings.

FIG. 13 illustrates the power and motion circuit of the apparatus illustrated in FIGS. 11–14. A motor 150 which is energized by any suitable source of energy, such as ordinary alternating current, is mounted to base 125 (by means not shown) and drives shaft 151 upon which is mounted pulley 152. Shaft 151 also drives variator 153. Variator 153 provides a variable drive output varying between any desired ratio, such as between 0.750:1 to 1.250:1. The actual ratio of input to output speed of the variator 153 is controlled by actuator 154 in a manner to be hereinafter described. Variator 153 drives shaft 155 which in turn rotates pulley 156. Pulley 156 is connected by belt 157 to pulley 158 which drives reversing gears 159. Reversing gear 159 provides rotational energy to shafts 160 and 161. The direction of rotation of shaft 161 is selected by manual means (not shown) in connection therewith. Thus, manual selection of the direction of shaft 161 is achieved. Shaft 161 drives pulley 162 which in turn drives belt 163 and thereby drives pulley 164 on shaft 165. Shaft 165 provides the input for speed selector 166 whereby the speed of rotation of output shaft 167 may be manually selected.

Shaft 167 drives pulley 168 which in turn drives belt 169 and pulley 170 attached to shaft 171. Shaft 171 drives gear 172 which is engaged with gear portion 173 mounted to winding ring 33. Winding ring 33, sometimes hereinafter referred to as a payoff ring, is journaled to the base unit 125 by bearing 176.

It can be readily understood from the portion of the power diagram as thus far described, operation of motor 150 causes winding ring 33 to rotate about the closed curved surface of toroidal object 20. The direction of rotation of winding ring 33 about its axis 34 is selected by reversing gear 159, and the speed of rotation of winding ring 33 about the axis is selected by speed selector 166.

To provide helical winding on the closed curved surface, cams 177 and 178 are provided, fixed to base 125. Cam 179 is also fixed to base 125 for purposes to be hereinafter described. Cams 177, 178 and 179 are shown in greater detail in FIG. 14.

Cam follower 180 is adapted to contact the camming surface of either cam 177 or 178. Cam follower 180 is connected by rod 181 to rack gear 182. The rack gear 182 engages pinion gear 183 which in turn is engaged to rack gear 184. Cam follower 180 is biased against cam 177 or 178 by suitable bias means such as spring 185. Payoff heads 131–134 are supported by the rack gear 184. A slot (not shown) is provided in rod 181 for selectively locating cam follower 180 against either cam 177 or 178. Pin 186 is provided for fixing the selection of position of cam follower 180 against the selected cam 177 or 178. The entire unit comprising cam follower 180, rack gears 182 and 184, pinion gear 183, spring 185 and payoff heads 131–134 is supported by winding ring 33 by means not shown.

As winding ring 33 rotates about the closed curved surface of the toroidal object, cam follower 180 continuously follows cam 177 or 178 so as to move away from and toward the axis 34 of the winding ring 33. This motion is induced to gear means 182 which in turn rotates gear rack 183 thereby causing gear means 184 to move back and forth in the direction along the axis 34 of the winding ring (along the surface of the toroidal object). This motion is illustrated by arrow 187 in FIG. 13.

Rotation of the toroidal object about its own axis 29 is provided from pulley 152 connected to shaft 151. Pulley 152 drives belt 188 which in turn drives pulley 189 to drive speed reducer 190. Speed reducer 190 reduces the speed of rotation of the input and provides an output to pulley 191 which in turn drives pulley 192 via belt 193 to rotate pulley 194. Pulley 194 drives belt 195 about a portion of the circumference of the toroidal object, thereby rotating the object about its axis 29. Freely-rotating pulley 196 is mounted to the base 125 by means (not shown) to provide tension to belt 195 to ensure sufficient friction between the belt and object to assure rotation of the toroidal object about its axis.

The operation of pressure rollers 141–144 is illustrated in FIG. 13 wherein the pressure rollers are mounted to support bracket 197 which in turn has cam follower 198 mounted thereto. Bracket 197 is spring-biased towards axis 34 of the winding ring 33 by tension spring 199. Cam follower 198 follows cam 179 mounted to base 125.

Figure 14:
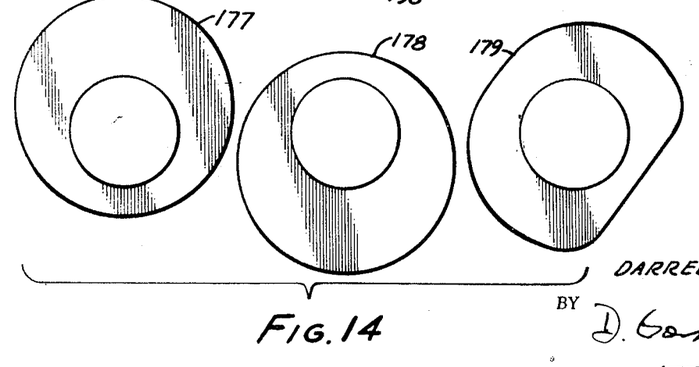
FIG. 14 is a plan view of camming means useful in the embodiment illustrated in FIG. 11.

FIG. 14 illustrates the three cams 177, 178 and 179. As indicated in FIG. 14, cams 177 and 178 are eccentric cams disposed approximately 180° apart. The shape of cam 179 is similar to the closed curved surface of the toroid. Cams 177 and 178 are disposed 180° out of phase to provide selection of the direction of winding of filament windings 21 on the toroid 20. Thus, for example, if cam follower 180 is disposed to contact cam 177, the winding is as in the direction illustrated in FIG. 12 (counterclockwise). If it is desired to wind in the opposite direction (clockwise), payoff heads 131 and 134 (FIG. 12) are utilized and cam follower 180 is adapted to contact cam 178 (FIG. 13). Selection of the particular cam which cam follower 180 follows is provided by the slot and pin mechanism 186 illustrated in FIG. 13.

By reversing the direction of rotation of shaft 161, the direction of rotation of ring 33 may be reversed so that the helical cord pattern may be reversed. Furthermore, two continuous filament cords may be wound at any one time by utilizing diametrically opposite payoff heads on ring 33 (see FIG. 12). Thus, payoff heads 132 and 133 may be used for one direction of rotation of the ring 33, and payoff heads 131 and 134 may be used for winding two cords when the ring is rotated in the opposite direction.

To wrap the cord 21 in a helical pattern, the payoff head is rotated about the closed curved surface of the toroid at a constant angular velocity. At the same time, the toroid is rotated around its own axis at a constant angular velocity. To correct for the differing linear velocity of different portions of the surface of the toroid, as hereinbefore explained, the payoff heads are reciprocated along axis 34 of the ring.

Another aspect of the invention illustrated in FIGS. 11–14 is the utilization of a feedback mechanism for continuously-sensing and correcting the position of the toroid object 20 in relation to the winding machine. As illustrated in FIG. 11, a feedback mechanism 200 is disposed on the inner portion of the toroidal object 20. This mechanism is illustrated in greater detail in FIG. 13.

In FIG. 13 there is illustrated an endless chain 202 wrapped around chain gears 203 and 204. Chain 202 includes a pair of pins 205 and 206 adapted to mate within aperture 23 of the toroid. Chain gear 204 is supported by the feedback mechanism 200 (illustrated in FIG. 11 but not shown in FIG. 13 for purposes of simplicity). Chain gear 203 drives shaft 207 and pulley 208. Pulley 208 drives belt 209 to turn gear 210 of differential 211. Gear 210 is mounted on bearings (not shown) to shaft 212 which in turn is connected to clutch 213. Thus, gear 210 is freely rotatable over shaft 212.

Shaft 160, driven by motor 150, drives pulley 214 which in turn drives belt 215 and pulley 216 to operate on speed reducer 217. Speed reducer 217 drives pulley 218 which in turn drives belt 219 to drive gear 220 of differential 211. Gear 220 is mounted on bearings (not shown) to shaft 212 so as to be freely rotatable on shaft 212. Gears 210 and 220 are interconnected by planetary gear 222 which in turn is connected to shaft 212 by spider hub 221. Clutch 213 is connected to variable potentiometer 223.

Clutch 213 is connected to potentiometer 223 in such a manner that rotation of the secondary plate of clutch 213 will vary the resistance of potentiometer 223. Potentiometer 223 is connected via lead 224 to electrical ground and via lead 225 to actuator 154. Actuator 154 is connected via lead 226 to electrical ground to form a closed circuit. A source of potential (not shown) is associated with actuator 154 so as to provide a source of power to the actuator. This source of potential may, for example, be the same source of potential utilized for energizing motor 150.

In the operation of the feedback mechanism herein described, motor 150 drives near 220 of differential 211. Also, chain 202 of the feedback mechanism drives gear 210 of the differential in the opposite direction from the direction of gear 220. Chain 202 is driven by the continuously-repetitive action of pins 105 and 106 in oppositely-disposed apertures 23 of toroid 20. If the rotation of gears 210 and 220 of differential 211 is exactly equal, the secondary plate of clutch 213 is not rotated and the setting of resistance of potentiometer 223 is not altered. If, however, the chain 202 drives gear 210 at a different rotational speed than gear 220 is driven by motor 150, gear 222 is rotated, thereby rotating shaft 212 to rotate clutch 213. Clutch 213 rotates the secondary plate of the clutch, thereby changing the setting of potentiometer 223. This causes a change in the electrical resistance in the circuit associated with actuator 154. Actuator 154 senses the change in resistance in potentiometer 223 to vary the ratio produced by variator 153. Variator 153 then adjusts the speed of shaft 155 to adjust the rotation of winding ring 33 about its axis. Also, the speed of rotation of gear 220 of differential 211 is likewise adjusted. The adjustment continues until the gears 210 and 211 are again in equal, but opposite, rotational speeds.

One aspect of the feedback mechanism is that the speed selector 166 for varying the speed of rotation of winding ring 33 about its axis and about the closed surface of the toroid 20 is not effected by action of the feedback mechanism. For example, the feedback mechanism which senses only the position of the tire, is insensitive to the speed of rotation of the winding ring about the toroid. Thus, the speed of rotation of winding ring 33 may be selectively altered at will without affecting the feedback mechanism.

As the winding operation continues, the diameter of the toroid grows slightly larger due to the thickness of the filament 21 supplied by payoff heads 131–134. The feedback mechanism associated with this embodiment of the invention maintains a correct pattern of filament windings on the toroid by continuously adjusting the speed of rotation of the winding ring 33 in relation to the speed of rotation of the toroid. Thus, if the winding ring 33 is adjusted so as to make 50 revolutions about the toroid for each revolution of the toroid itself, as the speed of rotation of the toroid varies, the speed of rotation of the winding ring is likewise varied so as to maintain the ratio constant, thereby maintaining a uniform and continuous filament winding pattern.

The present invention thus provides winding apparatus for winding filament material on a toroidal object. The winding operation may be to any suitable design and in any suitable pattern. The winding operation may produce toroidal objects having filament reinforced cords, such as for a tire, which are radial, helical, or any other suitable and desired pattern. The apparatus is simple to use and maintain, and is virtually free from error due to the accuracy of maintaining the relative motions involved and, in the case of the embodiment illustrated in FIGS. 11–14, due to the feedback mechanism for continuously correcting the position of the tire.

This invention is not to be limited by the embodiments shown in the drawings and described in the description, which are given by way of example and not of limitation, but only in accordance with the scope of the appended claims.

What is claimed:

1. Apparatus for winding filament material over an object having a toroidal surface defined by rotating a closed curved surface about an axis, comprising: guide means for guiding filament material onto the object; first means having an axis supporting said guide means for moving the guide means around the closed curved surface; second means for providing relative motion between said object and said first means about the axis of the object; and reciprocating means for moving the guide means along the axis of the first means.

2. Apparatus according to claim 1 wherein said second means comprises first drive means for rotating said object around the axis of said object.

3. Apparatus according to claim 2 wherein said first means comprises a winding ring having an axis, and second drive means for rotating said winding ring about its axis, said guide means including a payoff head supported by said winding ring for guiding filament material onto said object.

4. Apparatus according to claim 4 wherein said second drive means includes a movable belt adapted to contact a portion of said object to rotate said object about its axis.

5. Apparatus according to claim 3 further including feedback means for controlling the second drive means.

6. Apparatus according to claim 5 wherein said feedback means comprises sensing means for sensing rotation of said object about its axis, comparator means related to said sensing means and said second drive means for comprising the speed of rotation of said object and said second drive means, and variable means connected to said comparator means for varying the second drive means.

7. Apparatus according to claim 3 further including a motor, said first drive means including first mechanical coupling means connected to said motor to rotate said object around its axis at a desired angular velocity, said second drive means including second mechanical coupling means connected to said motor to rotate said winding ring about its axis at a desired angular velocity, said reciprocating means including third mechanical coupling means connected to said winding ring for moving said guide means along the axis of said winding ring.

8. Apparatus according to claim 7 wherein said third mechanical coupling means includes cam means associated with said winding ring for reciprocating said guide means along the axis of said winding ring during each revolution of said winding ring about its axis.

9. Apparatus according to claim 7 further including first selectable means for selecting the speed of rotation of said winding ring.

10. Apparatus according to claim 7 further including second selectable means for selecting the direction of rotation of said winding ring.

11. Apparatus according to claim 1 wherein said second means comprises first drive means for rotating said first means about the axis of the object.

12. Apparatus according to claim 11 wherein said first means comprises a winding ring having an axis, and second drive means for rotating said winding ring about its axis, said guide means including a payoff head supported by said winding ring for guiding filament material onto said object.

13. Apparatus according to claim 12 further including holding means for preventing rotation of said object about its axis.

14. Apparatus according to claim 13 wherein said object contains a plurality of apertures, said holding means being adapted to be inserted in at least one of said apertures for preventing rotation of said object.

15. Apparatus according to claim 14 wherein said holding means comprises a plurality of pin means each adapted to be inserted in respective ones of said apertures, and retracting means for retracting each of said pin means from the respective aperture to provide clearance for said winding ring when the winding ring is in the vicinity of a respective aperture.

16. Apparatus according to claim 12 further including a motor, said first drive means including first mechanical coupling means connected to said motor to rotate said winding ring around the axis of said object at a desired angular velocity, said second drive means including second mechanical coupling means connected to said motor to rotate said winding ring around its axis at a desired angular velocity, said reciprocating means including third mechanical coupling means connected to said winding ring for moving said guide means along the axis of said winding ring.

17. Apparatus according to claim 16 wherein said third mechanical coupling means includes cam means associated with said winding ring for reciprocating said guide means along the axis of said winding ring during each revolution of said winding rim about its axis.

18. Apparatus according to claim 16 further including first selectable means for selecting the speed of rotation of said winding ring.

19. Apparatus according to claim 16 further including second selectable means for selecting the direction of rotation of said winding ring.

20. A method for winding filament material over an object having a toroidal surface defined by rotating a closed curved surface about an axis, said method comprising: winding filament material around the closed curved surface of said object, simultaneously relatively rotating the object and the filament material about said axis, and simultaneously reciprocating the filament winding along the surface of said object.

21. The method according to claim 20 wherein said object is rotated about its axis.

22. The method according to claim 21 further including sensing the speed of rotation of said object about its axis and comparing the rotation of said object and the sensed rotation of said object to vary the speed of rotation of said object.

23. The method according to claim 20 wherein the filament material is rotated about said axis.

24. The method according to claim 23 further including restraining the object from rotation about its axis.

References Cited

UNITED STATES PATENTS

| | | | |
|---|---|---|---|
| 1,184,328 | 5/1916 | Dees | 156—397 XR |
| 2,657,865 | 11/1953 | Bennert et al. | 242—4 |
| 2,964,252 | 12/1960 | Rosenberg | 242—7.15 |
| 2,989,256 | 6/1961 | Lee | 242—7.12 XR |
| 3,375,150 | 3/1968 | Aleveff | 156—117 |
| 3,397,847 | 8/1968 | Thaden | 242—158 XR |

BILLY S. TAYLOR, Primary Examiner

U.S. Cl.X.R.

156—117, 175, 397, 430